United States Patent [19]
Kuzuno

[11] Patent Number: 5,093,954
[45] Date of Patent: Mar. 10, 1992

[54] WIPER BLADE WITH A SPOILER

[75] Inventor: Takashi Kuzuno, Kanagawa, Japan

[73] Assignee: Ichikoh Industries Ltd., Tokyo, Japan

[21] Appl. No.: 525,322

[22] Filed: May 18, 1990

[30] Foreign Application Priority Data

May 19, 1989 [JP] Japan .................. 1-124484

[51] Int. Cl.⁵ .............................................. B60S 1/04
[52] U.S. Cl. .............................. 15/250.42; 15/250.20
[58] Field of Search ............ 15/250.20, 250.42, 250.35, 15/250.32, 250.36, 250.41

[56] References Cited

U.S. PATENT DOCUMENTS

| | | | |
|---|---|---|---|
| 2,799,887 | 7/1957 | Nemic | 15/250.20 |
| 4,561,143 | 12/1985 | Beneteau | 15/250.42 |
| 4,590,638 | 5/1986 | Beneteau | 15/250.42 |
| 4,741,071 | 5/1988 | Bauer et al. | 15/250.42 |
| 4,766,636 | 8/1988 | Shinpo | 15/250.42 |

FOREIGN PATENT DOCUMENTS

| | | | |
|---|---|---|---|
| 1949948 | 4/1971 | Fed. Rep. of Germany | 15/250.42 |
| 3309972 | 9/1984 | Fed. Rep. of Germany | 15/250.42 |
| 1370826 | 7/1964 | France | 15/250.42 |
| 2594765 | 8/1987 | France | 15/250.42 |
| 1035798 | 7/1966 | United Kingdom | 15/250.42 |
| 2106775 | 4/1983 | United Kingdom | 15/250.42 |
| 2145928 | 4/1988 | United Kingdom | 15/250.42 |

Primary Examiner—Harvey C. Hornsby
Assistant Examiner—Gary K. Graham
Attorney, Agent, or Firm—Foley & Lardner

[57] ABSTRACT

In a wider blade for use with the vehicular windshield wiper system, the wiper blade has an elongated spoiler on one side thereof. One longitudinal spoiler end which is farther from the wiper drive shaft is shaped as a first curved portion which is bent away from the wiper blade, and the other longitudinal spoiler end nearer to the wiper drive shaft is formed as a second curved portion bent toward the wiper blade to cover a part of the gap between the spoiler and the blade rubber, these first and second curved portions being smoothly joined together by a central curved portion. The spoiler has a concavely shaped first side surface and a second side surface which are substantially parallel to the blade rubber, the second side surface being between the first side surface and the blade rubber. Thereby, the blade rubber can be surely prevented from lifting from the window pane even at higher driving speeds.

2 Claims, 6 Drawing Sheets

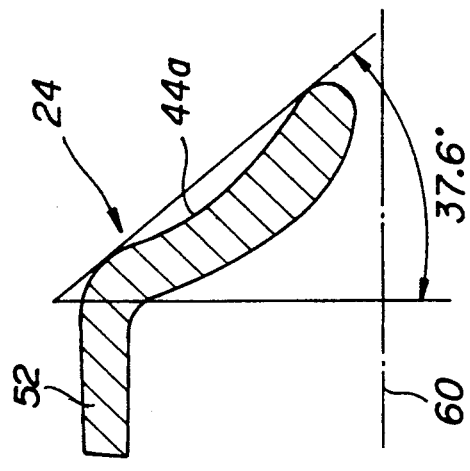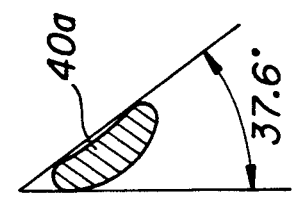
Fig. 7    Fig. 10
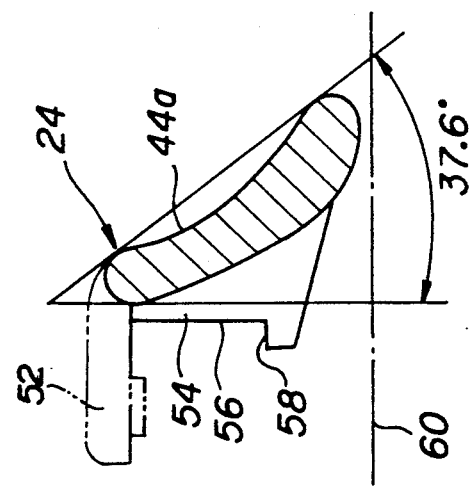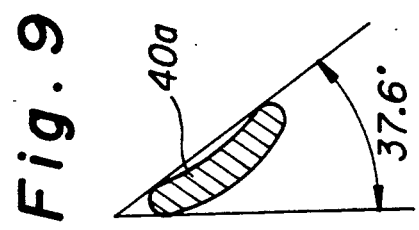
Fig. 6    Fig. 9
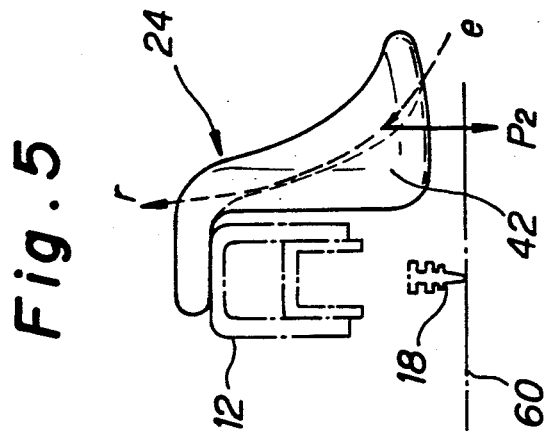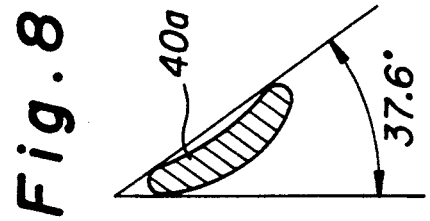
Fig. 5    Fig. 8

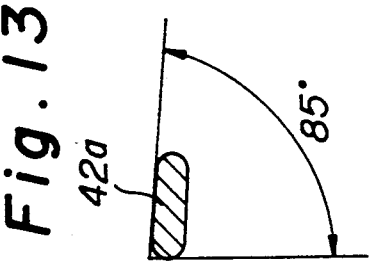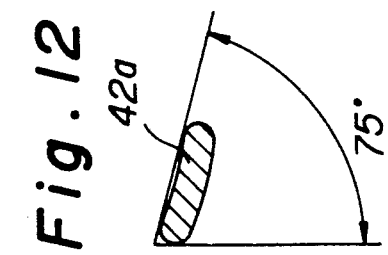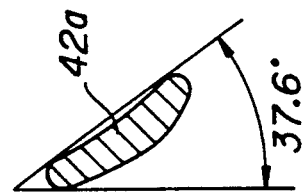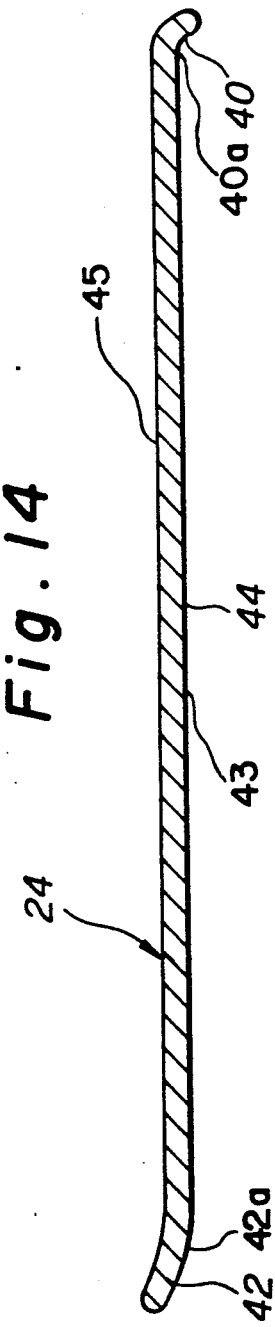

WIPER BLADE WITH A SPOILER

BACKGROUND OF THE INVENTION a) Field of the Invention

The present invention relates to a windshield wiper blade, and more particularly, to a wiper blade with spoiler.

b) Description of the Prior Art

Currently, windshield wiper assemblies of many different types are available but also it is well known that they have a tendency to lift from the window pane being cleaned when the vehicular driving speeds are high. For solving this problem, wiper blade assemblies with a spoiler have been proposed. For instance, the U.S. Pat. No. 4,741,071 discloses a windshield wiper blade assembly of which the main yoke has a spoiler formed integrally therewith. The spoiler extends from the rim of one of the side walls of the main yoke adjacent to the wiper element. In this known wiper blade assembly, the width and height of the side walls are selected such that the effective angle for the air stream between an imaginary line connecting the upper edge of the side wall and the free rim of the spoiler lies between 30 degrees and 60 degrees. To solve the same problem as discussed above, another solution has been proposed in the Japanese Unexamined Utility Model Publication No. 55-65244 which discloses a windshield wiper blade assembly having a spoiler formed separately from the main yoke thereof. FIG. 1 schematically shows a conventional wiper blade assembly of this kind. As seen, a vertebra 1 supporting a blade rubber 2 which is used to wipe a window pane 8 is supported by a primary yoke 5 by means of clawed yokes 3 and secondary yokes 4. The primary yoke 5 is supported by a wiper arm mounted on a wiper drive shaft (both not shown) and it is so driven, by a reciprocal circular motion of the wiper arm, as to make a reciprocal circular motion about the wiper drive shaft as indicated by the arrows a and b. In FIG. 1, the arrow A indicates a direction toward the wiper drive shaft, while the arrow B indicates a direction of the wiper blade motion away from the wiper drive shaft. A spoiler 6 is fixed to this primary yoke 5 and the angle of inclination thereof with respect to the window pane 8 is so selected that the air blown to the blade and spoiler 6 in the direction of arrow c along the window pane 8 is deflected in the direction of arrow d to produce in the direction of arrow Pl a force which presses the wiper blade to the window pane 8. The force in the direction of arrow Pl is conveniently increased or decreased as the vehicular driving speed is increased or decreased.

In the wiper blade assembly with the above-mentioned spoiler, however, the air stream flows into the back of the spoiler at one end of thereof which is nearer to the wiper drive shaft, and the air stream impinging on the spoiler front surface also enters the back of the spoiler at the other end thereof which is farther from the wiper drive shaft. These problems remain unsolved in the conventional wiper blade assemblies art. This will be further described below.

Since the wiper blade is reciprocally oscillated about the wiper drive shaft in the directions of arrows a and b, the position and angle of inclination thereof incessantly vary while in use. However, as the end of the spoiler at the wiper drive shaft side is almost always lower than the rest of the spoiler, it is likely to be affected by the wind or air stream impinging upon the hood of the car and flowing up in the direction of arrow e along the window pane. A part of the wind flowing in the direction of arrow e flows in between the spoiler 6 and blade rubber 2 as indicated with the arrow h and acts to force up the spoiler 6 from inside thereof, thus further causing the blade rubber 2 to lift from the window pane. This is the problem of "air stream flow-in" at the one end of the spoiler nearer to the wiper drive shaft.

Also, in the proximity of the other end of the spoiler 6 opposite to the wiper drive shaft, the wind blown in the direction of arrow i is deflected longitudinally of the spoiler 6 as indicated with the arrow j. The wind or air stream in this direction of arrow j is not sufficiently effective in forcing the wiper blade to the window pane 8. Furthermore, a part of this wind in the direction of arrow j flows into the back of the spoiler 6 as indicated with the arrow k and forces up the spoiler 6 from inside thereof. Namely, the air stream acts to further the lifting of the blade rubber 2.

These problems are found also in the wiper blade assembly disclosed in the previously-described U.S. Pat. No. 4,741,071.

SUMMARY OF THE INVENTION

The present invention has an object to overcome the abovementioned drawbacks of the conventional wiper blade assemblies by providing a wiper blade with an improved spoiler, in which air stream is prevented from flowing in to the back of the spoiler at the end thereof opposite to the wiper drive shaft and from flowing in to the back of the spoiler at the end thereof at the wiper drive shaft side, thereby stably forcing the wiper blade to the window pane at high diving speeds.

The above object is attained by providing a wiper blade having a spoiler which comprises a concavely shaped first side surface, a second side surface, a first curved portion which is bent away from the wiper blade, a second curved portion which is bent toward the wiper blade in order to cover a part of the gap between a central curved portion of the spoiler and a blade rubber, the central curved portion smoothly joining the first and second curved portions and the first and second side surfaces are substantially parallel to the blade rubber, the second side surface being disposed between the blade rubber and the first side surface.

The wind or air stream impinging upon the first curved portion is deflected away from the window pane and blade rubber. Thus, the wind is prevented from flowing inside the spoiler while the curved portion is applied with a force under which it is pressed to the blade rubber and window pane, thereby the blade rubber is prevented from lifting from the window pane surface.

While permitting to considerably reduce the flow-in to the back of the spoiler (into the gap defined with the blade rubber) of the wind blown to near the spoiler end at the wiper drive shaft side, the second curved portion can deflect the wind in a direction away from the window pane, so that the spoiler is applied with a force under which it is pressed to the window pane. Thus, similarly to the first curved portion, this second one can prevent the blade rubber from lifting from the window pane.

BRIEF DESCRIPTION OF THE DRAWINGS

FIG. 5 is a view of the spoiler from the direction of arrow III in FIG. 2, the wiper blade being indicated with dot-dash line;

FIG. 6 is a sectional view, enlarged in scale, taken along the line VI—VI in FIG. 4;

FIG. 7 is a sectional view, enlarged in scale, taken along the line VII—VII in FIG. 4;

FIGS. 8 to 10 are sectional views, enlarged in scale, taken along the lines VIII—VIII, IX—IX and X—X, respectively, in FIG. 4, showing the details of the second curved portion formed at the spoiler end nearer to the wiper drive shaft;

FIGS. 11 to 13 are sectional views, enlarged in scale, taken along the lines XI—XI, XII—XII and XIII—XIII, respectively, in FIG. 4, showing the details of the first curved portion formed at the spoiler end farther from the wiper drive shaft;

FIG. 14 is a sectional view taken along the line XIV—XIV in FIG. 3, showing the longitudinal profile of the spoiler;

DETAILED DESCRIPTION OF THE PREFERRED EMBODIMENTS

Figure 1:
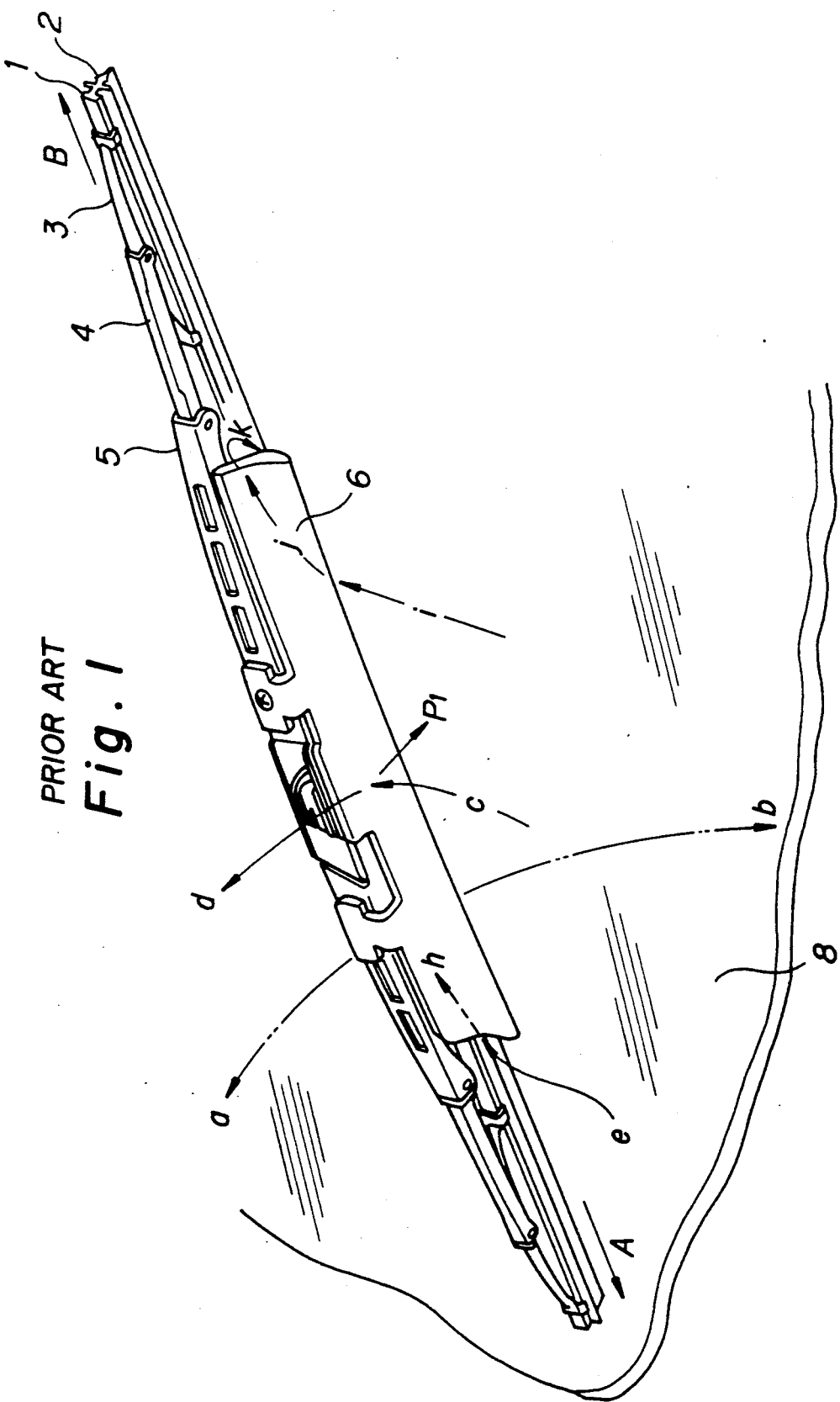
FIG. 1 is a schematic perspective view showing the conventional wiper blade with spoiler.
Figure 2:
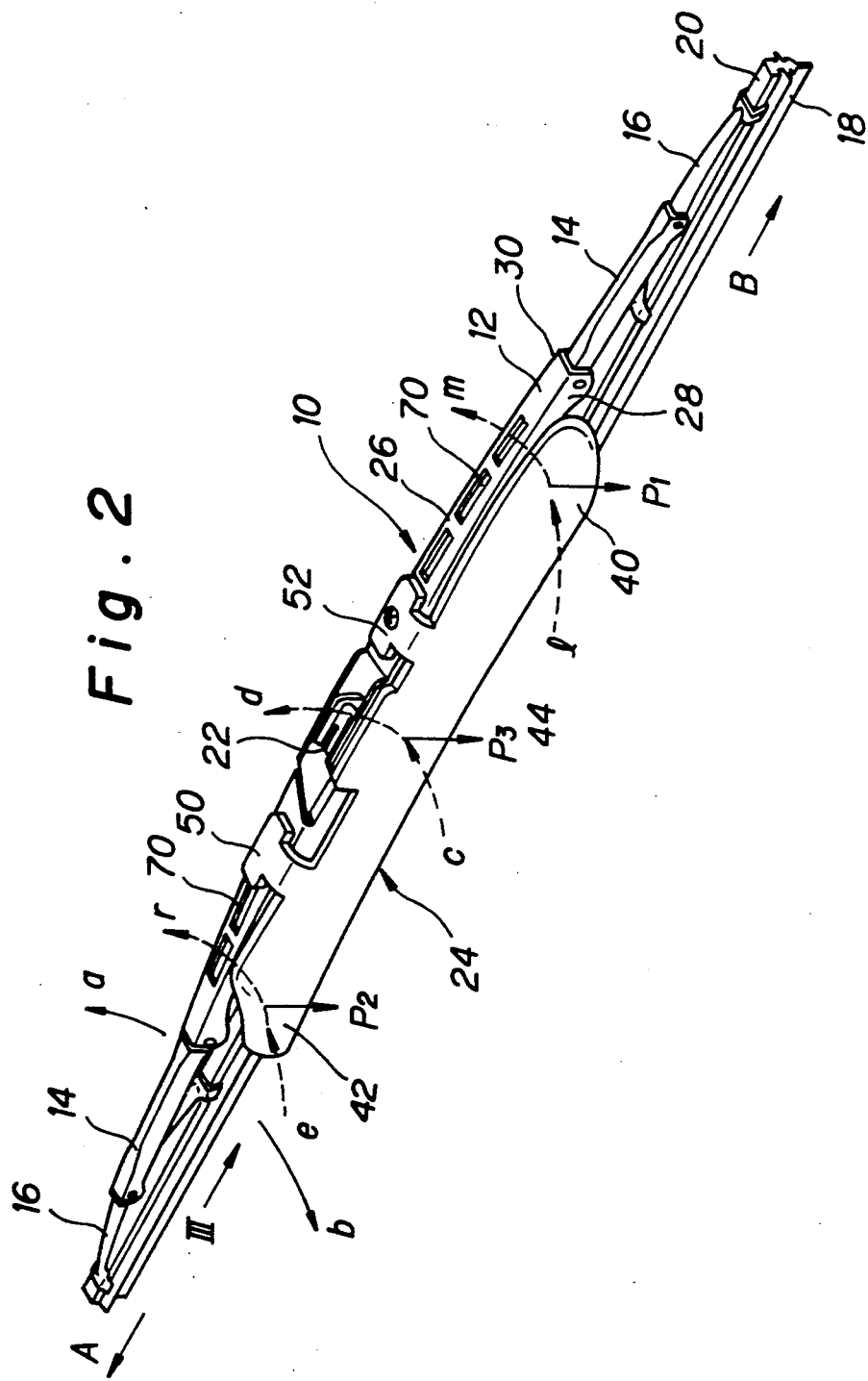
FIG. 2 is a schematic perspective view showing one embodiment of the wiper blade with spoiler according to the present invention.

FIG. 2 is a schematic perspective view showing an embodiment of the wiper blade with spoiler according to the present invention.

The wiper blade as a whole is indicated with the reference numeral 10, and it comprises a known supporting yoke system having a longitudinally straight primary yoke 12, two secondary yokes 14 and two clawed yokes 16. This supporting yoke system supports a vertebra 20 holding a blade rubber 18 which is used to wipe the surface of a window pane. The primary yoke 12 has a substantially U-shaped cross-section having a web 26 from which two side walls 28 and 30 extend nearly perpendicularly. The primary yoke 12 has formed at the center thereof a joint 22 to be articulated to a wiper arm (not shown) mounted on the wiper drive shaft (not shown) so that the wiper blade makes a reciprocal circular motion about the wiper drive shaft in the directions of arrows a and b due to the reciprocal circular motion of the wiper arm. In FIG. 2, the arrow A indicates a direction of the wiper blade motion toward the wiper drive shaft, while the arrow B indicates a direction away from the wiper drive shaft.

The elongated spoiler 24 according to the present invention is located at the side of the one of side walls 28 of the primary yoke 12 and fixed to a web 26 of the primary yoke 12. The spoiler 24 comprises a first curved or longitudinal end portion 40 which is bent away from the wiper blade 10, a second curved or longitudinal end portion 42 which is bent the wiper blade 10 in order to cover a part of the gap between the spoiler 24 and a blade rubber 18, and a central curved portion 44 which smoothly joins the first and second curved portions 40 and 42. The shape of the spoiler 24 will be described with reference to FIGS. 2 to 14.

As seen from FIGS. 6 and 7, the central curved portion 44 of the spoiler 24 is so shaped as to have a concave/4 shaped first side surface 44a going away from one 28 of the side walls of the primary yoke 12, that is, a curved surface inclined with respect to the window pane surface. The angle between a straight imaginary line connecting the upper and lower ends of the spoiler 24 and a place perpendicular to the window pane 60 is always 37.6 degrees. The radius of the curvature of the first side surface 44a is 25 cm, and the radius of curvature at the boundary between the central curved portion 44 and the first curved portion 40 or the second curved portion 42 is 30 cm. The central curved portion 44 thus formed deflects in the direction of arrow d along the concave surface, that is, upward, the air stream blown along the wind pane 60 (nearly perpendicular to one of the side walls 28 of the primary yoke 12) in the direction of arrow c. Thus, the spoiler 24 is forced in the direction of arrow P3, namely, in the direction toward the window pane 60.

The first curved portion 40 formed at the spoiler end farther from the wiper drive shaft has a concave/4 shaped first side surface 40a and is bent away from the wiper blade 10. FIG. 8 shows a cross-section of the boundary between the central and first curved portions 44 and 40. As seen, the angle between a straight imaginary line connecting the upper and lower ends of the spoiler 24 and a plane perpendicular to the window pane 60 of the primary yoke 12 is 37.6 degrees, and the radius of curvature of the first side surface 40a is 30 cm. This radius of curvature varies as it goes from the boundary between the first curved portion and the central curved portion 44 toward the spoiler end. Namely, the radius of curvature of the first side surface 40a shown in FIG. 9 is 25 cm, while the radius of curvature of the first side surface 40a shown in FIG. 10 is 40 cm. The air stream blown to the first curved portion 40 from the direction of arrow 1 is deflected in a direction away from the blade rubber 18 and window pane 60 as indicated with the arrow m. Because of such change in direction of the air stream, the first curved portion 40 is so forced as to be closer to the blade rubber 18 and window pane 60 as indicated with the arrow P1. Also, since the air stream having flown in the direction of arrow 1 is deflected in the direction of arrow m, the spoiler 24 may not possibly be lifted by the air stream flowing in to the back of the spoiler as in the conventional wiper blade. Namely, the spoiler is so formed as to receive the air stream going to flow upward along the surface thereof, thereby generating a counterlift.

The second curved portion 42 formed at the spoiler end nearer to the wiper drive shaft has a concavely shaped first side surface 42a and is bent toward the wiper blade 10 in order to cover a part of the gap between the inner wall of the spoiler 24 and the blade rubber 18. FIG. 5 is a schematic view of the first side surface 42a from the wiper driver shaft (in the direction of arrow III). As seen from FIGS. 11 to 13, the shape of this first side surface 42a varies as it is nearer to the spoiler end. FIG. 11 shows the cross-section of the boundary between the central and second curved portions 44 and 42. As seen from FIG. 11, the angle between a straight imaginary line connecting the upper and lower ends of the spoiler 24 and a plane perpendicular to the window pane 60 is 37.6 degrees, and the radius of curvature of the first side surface 42a is 30 cm. In FIG. 12, the angle of inclination of the first side surface 42a is 75 degrees, and the radius of curvature is 45 cm. In FIG. 13, however, the angle of inclination of the first side surface is 85 degrees while it is nearly flat. When blown from the direction of flow e to the second curved portion 42 thus shaped, the air stream is deflected in the direction of arrow r in which it goes away from the window pane 60. Therefore, because of the unique shape of this second curved portion 42, namely, since it has a concave first side surface and is curved in a direction toward the wiper blade 10 in order to cover a part of the gap between the inner surface of the spoiler and the blade rubber 18, the blade rubber 18 may not possibly be lifted by the air stream flowing into the gap as in the conventional wiper blade. The air stream from the direction of arrow e is deflected in the direction of arrow r, so that the spoiler 24 is applied with a force under which it is pressed in the direction of arrow P2, that is, toward the window pane 60. Thus, it is possible to prevent the flow-in of the air stream which would otherwise act to lift the wiper blade 10 and blade rubber 18 from the window pane. The spoiler 24 has a first concavely shaped side surface 43 which consists of first side surfaces 40l, 42a, and 44a, and a second side surface 45.

The air stream flowing inside the wiper blade 10 through the gap between the lower end of the spoiler 24 and the window pane 60 is led out upward through some slots 70 or openings formed in the web 26 of the primary yoke 12, so it will not act to lift the blade rubber 18. The force which presses the wiper blade 10 toward the window pane 60 as mentioned above is increased or decreased as the driving speed is higher or lower, respectively and its direction varies depending upon the angle of the spoiler 24 with respect to the air stream.

Figure 3:
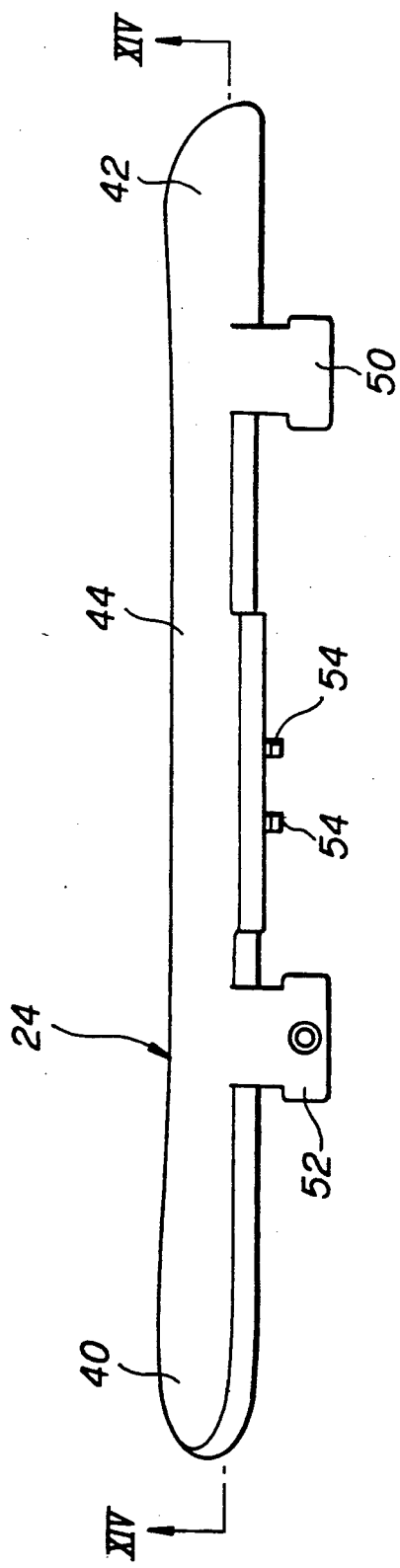
FIG. 3 is a plan view of the spoiler according to the present invention.
Figure 4:
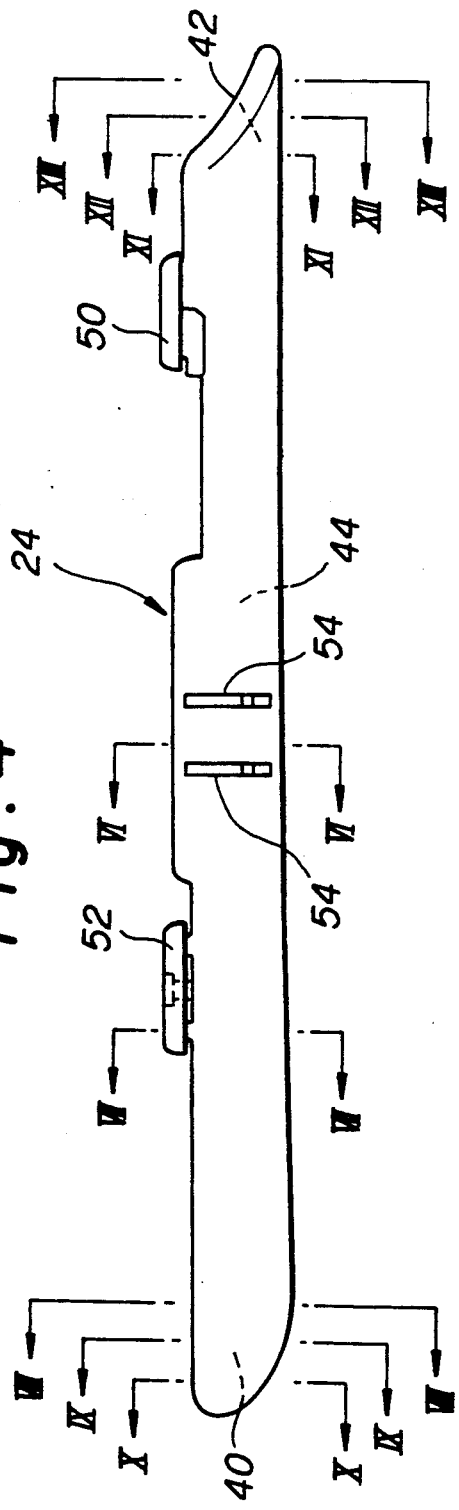
FIG. 4 is a rear view of the spoiler.
Figure 15:
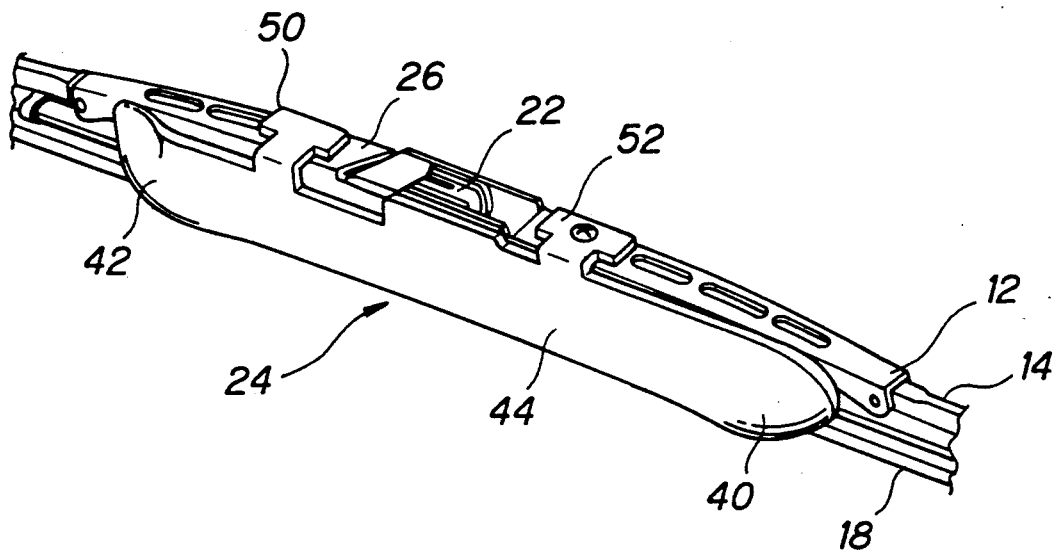
FIG. 15 is a schematic perspective view, showing the spoiler mounted on the primary yoke of the wiper blade, with the wiper blade being shown as partially omitted.
Figure 16:
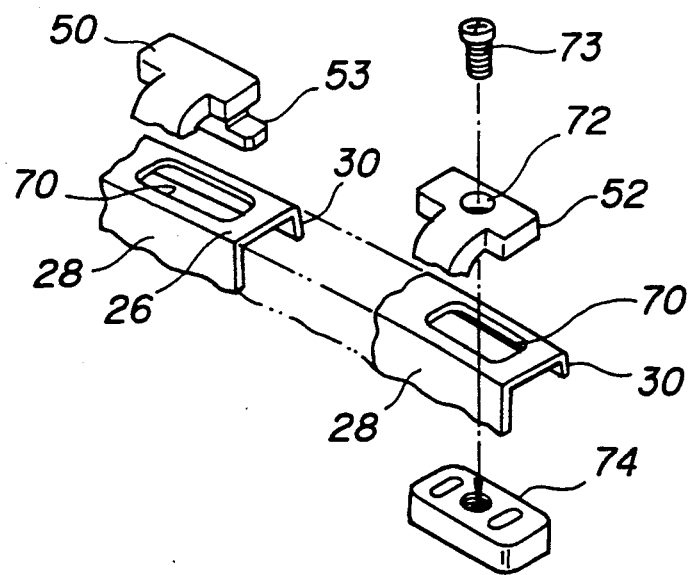
FIG. 16 is an exploded perspective view with essential portions being shown as enlarged in scale and partially omitted, for explanation of the manner of mounting the spoiler to the primary yoke of the wiper blade.

The mounting of the spoiler 24 to the primary yoke 12 will be discussed with reference to FIGS. 15 and 16. The spoiler 24 has formed integrally on the top thereof fixtures 50 and 52 which secure the spoiler to the web 26 of the primary yoke 12. As shown in FIGS. 3, 4 and 6, the spoiler 24 has integrally formed thereon engagement members 54 which engage the side wall 28 of the primary yoke 12. The fixtures 50 and 52 are located correspondingly to the positions of the slots 70 formed in the web 26 of the primary yoke 12 adjacently to the joint 22 to be articulated to the wiper arm, and they have sizes somewhat larger than those of the slots 70. As shown in FIG. 16, the fixture 50 has formed thereon as nearly horizontally extended a hook 53 so shaped that it can be inserted in one of the slots 70 and which is engageable on the edge of the slot 70. The other fixture 52 has formed therein a through hole 72 through which a fixing screw 73 is inserted. There is located between the two side walls 28 and 30 of the primary yoke 12 a nut member 74 having a sufficient size to cover the slot 70. The fixture 52 is fixed to the web 26 of the primary yoke 12 by tightening the fixing screw 73 into the nut member 74. The engagement members 54 are formed in pair on the back of the central curved portion 44, each thereof consisting of an upright wall 56 generally vertically extending in contact with the side wall 28 of the primary yoke 12 and a receiving portion 58 nearly horizontally projecting from the lower end of the upright wall 56 so as to receive the lower end of the side wall 28 of the primary yoke 12. Therefore, the spoiler 24 is securely fixed to the primary yoke 12 by means of the fixtures 50 and 52 and the engagement members 54.

The tests were made on the spoiler according to the present invention. The spoiler was mounted on an example wiper blade which was inherently provided with no spoiler and of which the blade rubber was found lifted from the window pane at a driving speed of 160 km/h. The test results proved that the blade rubber is not lifted from the window pane when the wiper is moving in the opening direction (the direction of arrow a in FIG. 2) at a driving speed up to 190 km/h, and also when the wiper iss moving in the closing direction (the direction of arrow b in FIG. 2) at a driving speed up to 210 km/h.

What is claimed is:

1. A wiper blade comprising:
    a) a yoke;
    b) a blade rubber connected to said yoke, said blade rubber being in contact with a window pane; and
    c) an elongated spoiler mounted to said yoke including:
        a first longitudinal end portion bent away from said blade rubber,
        a second longitudinal end portion bent toward said blade rubber,
        a central portion smoothly joining said first longitudinal end portion to said second longitudinal end portion,
        said central portion having a first side surface substantially parallel to said blade rubber,
        said central portion having a second side surface disposed between and substantially parallel to said blade rubber and said first side surface, and
        wherein said first side surface is concavely shaped over the extent of said central portion, and said second longitudinal end portion partially covers an end gap between said central portion and said blade rubber.

2. A wiper blade according to claim 1, wherein said first side surface is concavely shaped to direct an air stream impinging on and flowing on said window pane away from said window pane.

* * * * *